INVENTOR.
ALVIN GUY VAN ALSTYNE

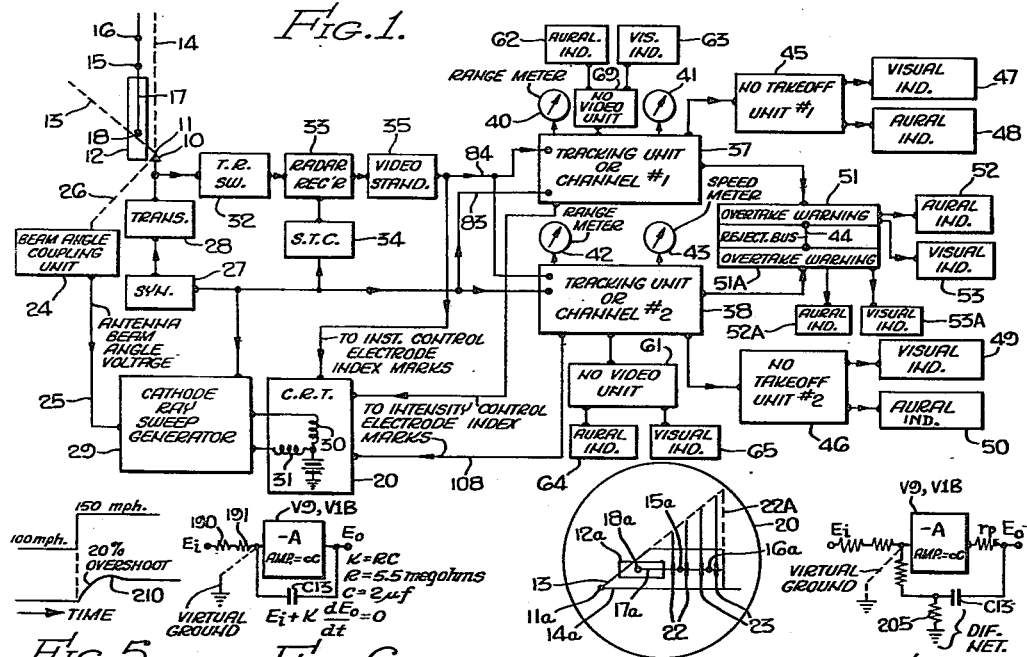
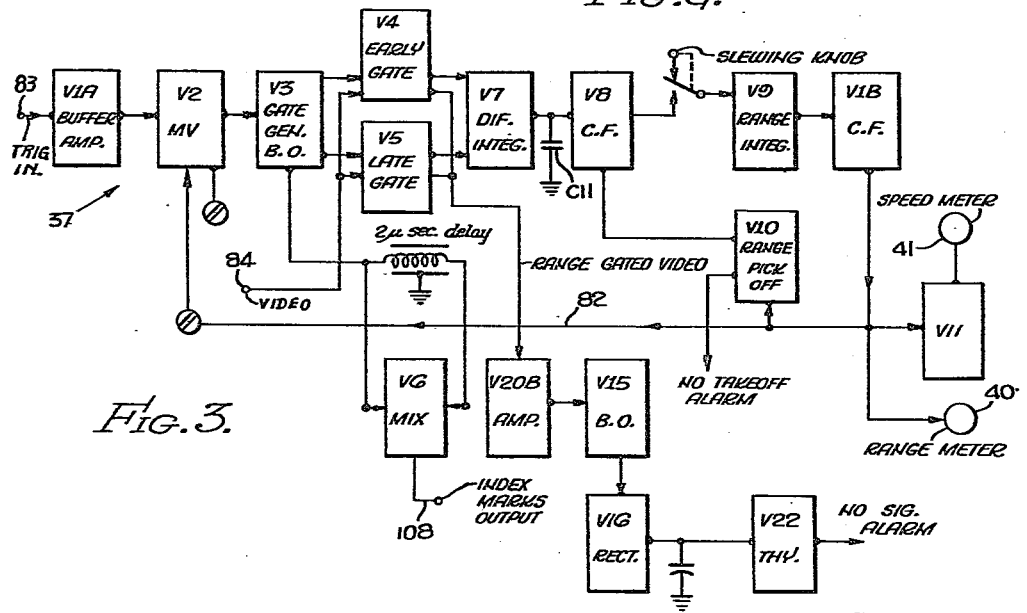

United States Patent Office 2,795,781
Patented June 11, 1957

2,795,781

RANGE TRACKING

Alvin Guy Van Alstyne, Los Angeles, Calif., assignor to Gilfillan Bros., Inc., Los Angeles, Calif., a corporation of California Application August 29, 1951, Serial No. 244,111

12 Claims. (Cl. 343—7.3)

The present invention relates to improved means and techniques for tracking objects in the course of their flight; and, in particular, relates to means and techniques for tracking the flight of aircraft in the approach zone to a landing field while a radar antenna beam scans such zone.

The arrangement is described and shown herein in relationship to a conventional GCA (ground control approach) aircraft landing system wherein the pilot of the aircraft is "talked down."

The present invention contemplates improved apparatus for range tracking an object, such as an aircraft, in its flight, so as to obtain information as to its instantaneous range and speed.

A specific object of the present invention is to provide an improved range tracking apparatus which depends heavily for its operation on velocity memory means, with associated means functioning so as to anticipate the position of the aircraft thereby to reduce the tendency of the tracking circuit to lock on ground clutter.

Another specific object of the present invention is to provide an improved range tracking apparatus of this character in which a plurality of aircraft may be range tracked simultaneously.

Another specific object of the present invention is to provide an improved arrangement of this character in which manual aircraft acquisition in each tracking unit or apparatus, i. e. channel, is obtained by means of a manual control knob, which serves to control the position of range tracking gates in accordance with a substantively linear relationship between the position of such gates and angular position of the control knob.

Another specific object of the present invention is to provide an improved apparatus of this character for developing tracking gates and for visually indicating the position of such tracking gates without seriously detracting from the conspicuousness of the associated radar signals, also visually indicated on the same cathode ray tube.

Another specific object of the present invention is to provide an improved arrangement of this character wherein a control is provided in each tracking channel, such control functioning to remove the related tracking gate from the visual displays without affecting the tracking operation.

Another specific object of the present invention is to provide improved apparatus of this character which incorporates velocity memory means, such memory means functioning so that the related tracking gates travel between radar "hits" at a previously determined velocity of the tracked aircraft.

Another specific object of the present invention is to provide an improved arrangement of the character mentioned in the preceding paragraph in which the memory means in responding to the loss of a video signal from the tracked aircraft operates for a maximum period of, for example, five seconds after the last radar video signal; thereafter if the video signal is still absent, the tracking gate comes to rest and suitable automatic aural and visual indications are produced.

Another specific object of the present invention is to provide an improved arrangement of this character in which the memory means is sensitive to a minimum memorized velocity so as to reduce the tendency of the tracking circuit to lock on ground clutter, the minimum velocity being, for example, approximately 50 knots or 50 miles per hour for ranges from touchdown to an adjustable maximum range up to, for example, five miles.

Another specific object of the present invention is to provide an improved range tracking circuitry featured by the fact that it produces and supplies the range and velocity data of the tracked aircraft.

Another specific object of the present invention is to provide an improved tracking circuit which functions as such even though the video signals supplied thereto are "interrupted" as a result of the antenna beam not being constantly trained or aimed at the target, i. e. aircraft, but with the antenna beam scanning a relatively large zone in which other aircraft may be present.

Another specific object of the present invention is to provide an improved tracking circuit of this character in which electronically produced range data is caused to vary, i. e. "coast" at a rate determined by past history of the speed of travel of the tracked aircraft so as to anticipate the future position of the aircraft.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a block diagram of a system and apparatus incorporating features of the present invention;

Figure 2 shows the type of visual display obtained on the face of the cathode ray tube which is an element of the system shown in Figure 1;

Figure 3 is a block diagram of apparatus included in each one of the tracking units illustrated as such in Figure 1;

Figure 4:
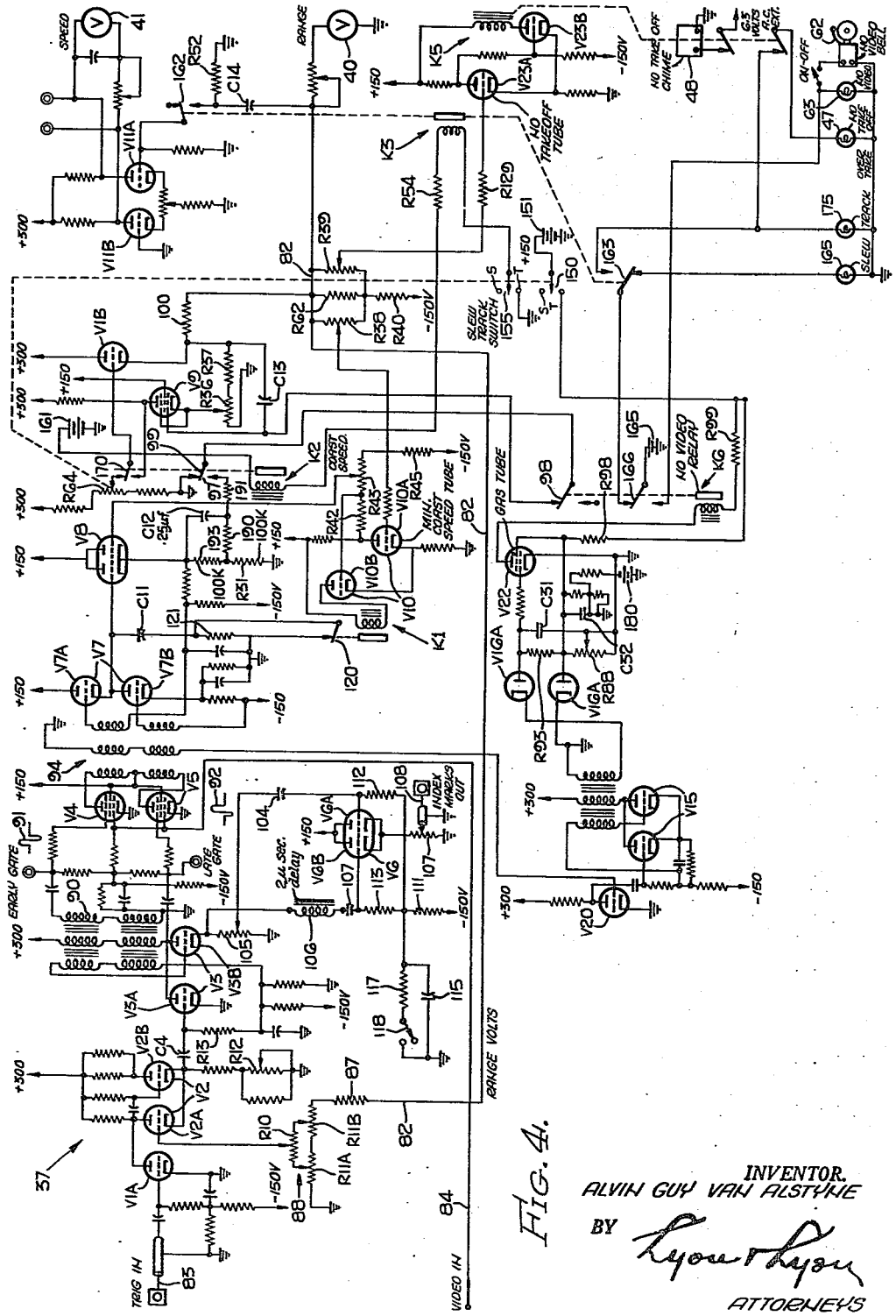
Figure 4 is a schematic diagram showing in more detailed form circuitry indicated in block diagram in Figure 3 with related circuitry indicated in Figure 1.

Figure 5 serves to illustrate the dynamic response to the tracking loop occasioned by an assumed change in speed.

Figures 6 and 7 serve to illustrate equivalent circuits of the second integrator stage.

For purposes of tracking one aircraft so as to obtain data as to its range and speed, one tracking unit or apparatus, i. e. one channel, either unit 37 or 38 of the character shown in Figures 1, 3 and 4 is required. For purposes of obtaining the same data regarding two different aircraft simultaneously in the approach zone to an aircraft landing field, the tracking apparatus shown in Figures 1 and 2 is duplicated, i. e. both units 37 and 38 are required as shown in Figure 1; for obtaining the same data regarding three aircraft, the apparatus is triplicated and so forth. By using a plurality of such apparatus, data is automatically obtained as to the relative distance between the tracked aircraft.

It should be noted, however, that only one radar installation is required for developing the synchronizing triggers and the associated video signals, the synchronizing signals and radar video being supplied to each one of the tracking units 37, 38 which are likewise termed channels or apparatus herein. Only one of the tracking channels is described in detail for it is understood that the other tracking channels are of identical construction and function in the same manner.

The present apparatus incorporates manually operative means for producing target acquisition. The tracking of the aircraft is displayed visually by adding to the cathode ray indicator tube presentation a pair of vertical bars 22 or 23 (Fig. 2) each of which represent the leading and trailing edges of the tracking range gate developed in the apparatus. These vertical pairs bracket the associated targets 15A, 16A respectively. Separate intensity controls for the range gate displays are provided, permitting adjustment to be made so that no impairment of the radar display results. A momentary switch is also provided so that the operator may remove the parallel bars from the display so that he may ascertain on which target the associated tracking channel is working.

The tracking channel incorporates velocity memory means. Such velocity memory means continuously provides a predicted range position of the target during intervals when target video is not available as, for example, when the antenna beam is scanning through space adjacent the aircraft. The dynamic performance characteristic of the tracking channel is such as to rely heavily upon memory of velocity. The resulting performance is such as to minimize the tendency of a particular tracking channel to lock onto ground clutter signals instead of continuously following the aircraft in its flight. The absence of radar video signals from the tracked target or aircraft for a period of, for example, 5 seconds causes actuation of an automatic aural and visual alarm for the monitoring operator, using the "No Video" units 60, 61 in Fig. 1.

To further improve the ability of the tracking channel to follow an aircraft through clutter areas, the tracking channel incorporates means which will not permit the tracking channel to move forward with a velocity less than approximately 50 miles per hour, thus reducing the tendency of the tracking channel to lock on stationary targets.

The output of the range tracking channel is essentially (1) the instantaneous range of the aircraft shown on corresponding meters 40, 42, (2) the velocity of the aircraft shown on corresponding meters 41, 43, and (3) a range gate developed in the channel to provide a visual display of the tracked aircraft as seen by the pairs of index marks 22 and 23 in Fig. 2;

An additional safety feature involves interference between incoming landing aircraft and those entering the runway for take-off. To minimize hazard and to make sure that the operator is aware of aircraft on approach, a warning is provided when a landing aircraft is a predetermined distance from touchdown and indicated on indicators 47, 48, 49, 50. This predetermined range is adjustable from one to five miles from touchdown and is designated herein as the "No Take-off Warning" area.

The tracking channel 37 thus incorporates means for indicating the range to touchdown and the radial velocity of the tracked aircraft on meters 40 and 41 respectively. Aural notification is given when an aircraft enters the "No Take-off Warning" range on indicator 48. This notification is preferably in the form of a chime tone; but, in addition, means are incorporated for producing a continuous visual indication on indicator 47 of this condition until the aircraft is released at touchdown.

The radar system shown in Figure 1 includes an antenna 10 disposed at the point 11 adjacent the aircraft landing strip 12 for producing a radiated radar antenna beam, which scans between the limits indicated by the radial lines 13 and 14, both emanating from the point 11 so as to include that area within the approach zone to the landing strip 12 to which aircraft 15, 16, are flown along or adjacent to a predetermined runway line 17, such line 17 terminating at the touchdown point 18.

Conventional apparatus which, per se, forms no part of the present invention is coupled to the antenna 10 for producing a cathode ray tube display of the character shown in Figure 2 on the face of the cathode ray tube 20. The display on cathode ray tube 20 in Figure 2 is representative of those aircraft landing conditions shown in Figure 1 and the two aircraft 15, 16 appear as corresponding visible indications 15A, 16A. The runway line 17A may be produced electronically by conventional means which, per se, forms no part of the present invention, the small rectangle 12A may be a transparent overlay so as to correspond with the landing strip 12 and the radial lines 13A, 14A, define the limits through which the cathode ray beam is caused to periodically sweep. These cathode ray beam sweeps originate from the point 11A corresponding to the situs 11 of the radar equipment.

The cathode ray tube display shown in Figure 2 also includes two pairs of index marks 22, 23, bracketing the aircraft images 15A and 16A, respectively. These pairs of index marks 22, 23 are produced electronically in accordance with certain important features of the present invention. The small rectangle in Figure 2 defined by the dotted portions of lines 13A and 22A serves as an indication of that portion of the display which is limited or clipped, i. e., rendered invisible. Such pattern limiting or clipping forms, per se, no part of the present invention and is, for present purposes, considered conventional.

For purposes of obtaining cathode ray beam sweeps to form the pattern shown in Figure 2, the scanning movement of the antenna beam emanating from antenna 10 is converted by a so-called beam angle coupling unit 24 into a so-called antenna beam angle voltage which appears on the lead 25. Such voltage may vary from 2 to 52 volts depending upon the particular orientated position of the radiated antenna beam. The coupling unit 24 is coupled to a scanning element of the antenna 10 by means of a mechanical connection indicated by the dotted line 26.

The antenna 10 is supplied with pulsed energy timed in accordance with synchronizing pulses developed in the synchronizer unit 27 and applied to the transmitter 28. The synchronizing pulses are developed at, for example, a rate of 2,000 pulses per second and are likewise applied to the cathode ray sweep generator 29 for supplying sweep currents to two quadraturely acting deflection coils 30 and 31 in timed relationship with the synchronizing pulses. The sweep currents applied to one of the deflection coils 30 is modulated by the above mentioned slower varying beam angle voltage applied to the sweep generator through lead 25. The rate of variation of the beam angle voltage is such that it varies cyclically, for example, from 2 volts to 52 volts and then 52 back to 2 volts, all in one second.

The radar echo signals resulting from the reflections from the aircraft 15, 16 are transferred through the transmit-receive switch 32 to the input terminal of the radar receiver 33. The radar receiver 33 may have so-called conventional sensitivity time control circuit 34 coupled thereto, such circuit being supplied with synchronizing pulses from the synchronizer 27. The output of the radar receiver 33 in the form of video is applied to the video standardizer unit 35 of the character described in the above mentioned copending application and the output of such video standardizer 35 is transferred on the one hand to an intensity control electrode of the cathode ray tube 20 and on the other hand to each of the tracking channels 37 and 38 which are designated respectively "tracking channel" No. 1 and "tracking channel" No. 2.

Each of these tracking channels 37, 38, as described in detail hereinafter, serves to develop pairs of voltages which are applied as index mark voltages to an intensity control electrode of the cathode ray tube 20 for producing the corresponding index marks 22, 23, as represented in Figure 2. Tracking unit 37 while tracking aircraft 15 produces the index marks 22 while the tracking unit 38 in tracking the aircraft 16 produces the index marks 23.

The range and speed of aircraft 15 are indicated respectively on the range meter 40 and speed meter 41; simultaneously, the range and speed of aircraft 16 is indicated on range meter 42 and speed meter 43.

The tracking units 37 and 38 have associated therewith, respectively, the so-called "No Take-Off" units 45, 46, for producing both visual and aural warnings of the fact that an incoming aircraft is within, for example, four miles of its touchdown point 18 (Fig. 1). Such warnings or indications are produced on the appropriately designated indicators 47, 48 on the one hand and 49 and 50 on the other hand. Also each one of the tracking units 37, 38 has associated therewith so-called "No Video" units 60, 61, respectively, for producing both aural and visual indications on corresponding indicators 62, 63, and 64, 65 respectively should there be a loss of video signal from the tracked aircraft for a period exceeding, for example, five seconds.

The tracking unit 37 is identical in all respects to the tracking unit 38 shown in Figures 3 and 4 and utilizes a servo loop to which the system trigger is applied on lead 83 and to which video is applied from lead 84.

In general, the servo loop includes the multivibrator stage V2, the blocking oscillator stage V3, the early and late gate detector V4, V5, the differential integrator stage V7, the cathode follower stage V-8, the range integrator stage V9, cathode follower stage V-1B, and the lead 82 extending from the stage V-1B to the multivibrator stage V2 completes the loop. The voltage on such lead 82 is termed "the range voltage" and is a measure of the range of the tracked aircraft, either when such aircraft is being tracked manually or automatically.

The volt meter 40 connected to the lead 82 through the adjustable resistance 85 serves to indicate the range of the tracked aircraft. In order to obtain an indication of the speed of the tracked aircraft on the speed volt meter 41, such volt meter 41 is coupled to the lead 82 through a differentiating network and D.-C. amplifier which includes the tube V11. By differentiating the range voltage with respect to time, a speed voltage is developed on meter 41 and indicated thereby.

The above mentioned servo loop includes two integrator circuits which include, respectively, the condenser C11 and condenser C13, condenser C13 being associated with the range integrator stage V9. The voltage developed on condenser C11 is a measure of the velocity of the tracked aircraft and voltage derived from such condenser C11 is integrated in the stage V9 and applied as aircraft range voltage to the aforementioned lead 82.

The manner in which the so-called speed voltage appearing on condenser C11 is developed is now described in relationship to the stages V-1A, V2, V3, V4, V5 and V7.

The system trigger is applied through lead 83 to the buffer stage V-1A and, after amplification therein, is applied as a negative pulse to the control grid of V-2B. The tubes V-2B and V-2A comprise a part of the multivibrator stage V-2. It is observed that the tube V-2B in its quiescent state, is highly conducting since a positive voltage appears at such time on its control grid. The cathodes of tubes V-2B and V-2A are interconnected so that in such quiescent state the cathode of V-2A is at a relatively high positive potential. The so-called range voltage appearing on lead 82 is applied through resistance 87 and through a voltage dividing network 88 to the control grid of V-2A. The multivibrator stage V-2 serves to develop a gating voltage on the cathode of tube V-2A, the duration of which varies in accordance with the magnitude of the voltage on lead 82. Such gating voltage is started upon appearance of the system trigger, in inverted form, to the control grid of tube V-2B. The multivibrator stage V-2 is thus termed a timing modulator since it serves to develop a negative-going gating voltage on the cathode of tube V-2B, having a duration representative of the magnitude of the voltage appearing on lead 82.

Such negative-going gating voltage is differentiated by the differentiating network comprising capacitor C-4 and resistance R13, which are in the grid circuit of the blocking oscillator stage V-3. A positive pulse corresponding to the trailing edge of the negative-going gating voltage is thus applied to the control grid of the blocking oscillator stage V-3. Such positive pulse is of course delayed with respect to the system trigger in an amount corresponding to the duration of the negative-going gating voltage developed in stage V-2. It is noted that the potentiometer resistance R12 is adjusted so that with zero voltage applied to lead 82, a delay is interposed corresponding to the aircraft touchdown position while resistances R10, R11A and R11B allow adjustment of the scale of the delay with respect to range voltage.

The blocking oscillator stage V-3 has two separate output circuits, one of which includes the winding 90 for developing a so-called early gate. A late gate is developed on the anode of tube V-3B. The first or "early" gate consists of a positive-going wave form 91 followed by a negative-going wave form and is applied to the early detector V-4. The second or "late" gate 92 consists of a negative-going wave form followed by a positive-going wave form and is applied to the suppressor grid of the late detector V-5. These positive portions of the pulses 91, 92 produced by oscillator V-3 thus appear alternately at the suppressor grids of the early-late gate detectors V-4 and V-5 causing them to be placed in a condition that they may conduct when positive video signals are coincidentally applied from lead 84 to the respective control grids of tubes V-4 and V-5. In other words, tubes V-4 and V-5 are essentially coincident tubes arranged to conduct only when there is a positive signal applied both to their control grids and suppressor grids.

Preferably the video applied to lead 84 is so-called standardized video in which each video signal, resulting from a reflection from the aircraft, has a uniform height and a uniform width so that, in effect, such video may be uniformly compared with the positive portions of the wave forms 91, 92.

The signal passed by the early-late detectors V-4, V-5 is applied to the grids of a differential integrator circuit consisting of two triode sections of V-7A and V-7B of stage V-7.

It is observed that video signals corresponding with the positive-going portion of the early gate 91 are passed by tube V-4. Video signals corresponding with the positive-going portion of the late gate 92 are passed by tube 92. The signal appearing on the anode of tube V-4 is applied through pulse transformer 94 to integrator tube V-7A so as to charge condenser C11. Video signals corresponding with the positive portion of the late gate 92 are passed by tubes V-5 and applied by pulse transformer 95 to the control grid of the integrator tube V-7B, lowering the voltage on capacitor C11. The combined effect therefore of the early-late gate detector circuitry is to charge condenser C11 when radar video corresponds with the early gate (indicating that the aircraft is moving forward at a rate greater than that of the range gate), and to discharge condenser C11 at the time of coincidence of video signals with the late gate (indicating that the gate is going forward at a greater rate than the aircraft). The combined output of tubes V-7A and V-7B appearing across condenser C11 therefore may be interpreted as a "speed" voltage for the tracked aircraft. It is noted that the range gate mentioned in the previous sentence, is defined by the positive portions of the wave forms 91, 92, such positive portions being displaced, of course, along the time axis. This speed voltage appearing across condenser C11 produces a proportional voltage on the cathode of the cathode follower tube V-8.

Such voltage appearing on the cathode of tube V-8 is applied to the control grid of the range integrator tube V-9 through switch 97 of relay K2 and switch 98 of relay K6. It is noted that the relay K2 is shown in its de-energized condition corresponding to the condition wherein the circuitry is adjusted for manual tracking, i. e. slewing. When the circuitry is conditioned for automatic tracking the winding of relay K2 is energized so as to close the switch 97 and to open the switch 99. Relay K6 is shown in its automatic tracking position which, of course, corresponds to the de-energized condition of the winding of relay K6.

Thus in automatic tracking the "speed" voltage appearing on the cathode of V-8 is applied to the control grid of the second integrator stage V-9 and the integrator output appears on the cathode of tube V-1B which is a cathode follower. Such voltage appearing on the cathode of V-1B is applied through resistance 100 to the range voltage lead 82. This voltage on the cathode of tube V-1B consists of integrated "speed" voltage and represents the range of the tracked aircraft in terms of nautical miles.

It is noted that the lead 82 is connected to variable potentiometer resistances R38, R39, and fixed resistance R62, each of such resistances being connected in parallel. The adjustable tap on resistance R38 is connected to the minimum coast speed circuit which includes the tubes V-10A and V-10B. The adjustable tap on resistance R39 is connected to the "No Take-Off" circuit which includes the tube V-23A, V-23B.

The potential existing on lead 82 is measured by the range volt meter 40 on a linear scale with the maximum range of 10 miles represented by a 50-volt potential. In other words, the scale is 5 volts per mile.

The output measured by the range volt meter 40 is applied, for purposes of obtaining a visual indication of speed of the aircraft, to a differentiating network consisting of a C14 and R52. The voltage at the output of this differentiating network representing speed is applied to the control grid of tube V-11A. This speed voltage, appearing as a potential across the anodes of tubes V-11A and V-11B is measured by the speed volt meter 41 on a scale of 0-50 microamperes, expressed as 0-250 miles per hour.

As indicated above, the potential measured by the range volt meter 40 is also applied to the control grid of the delay multivibrator which includes the tubes V-2A and V-2B, the gate width of the multivibrator output being controlled by such range voltage applied through the R10, R11A, R11B potentiometer combination. The pulse width of the output of the multivibrator V-2, controlled as a direct function of range voltage, causes the tracking movement of the index marks 22 (Fig. 2) in the cathode ray tube display. Aircraft with increasing speed approaching the radar installation cause video pulses to coincide with the positive portions of the early gates 91, charging condenser C11, causing the speed voltage at the cathode of tube V-8 to rise, and the range voltage from V-9 to fall. Decreasing range voltage decreases the gate width of the output of multivibrator V-2 and causes the index marks 22 (Fig. 2) to move along the display toward the point 18A of indicated touchdown. The manner in which such index marks 22 bracketing the aircraft image 15A, are produced from the early and late gates 91, 92 is now described.

For purposes of developing the index marks 22, voltages representative of the early and late gates and appearing on the cathode of tube V-3B are applied to the control grids of tubes V-6A, V-6B. The grid of tube V-6A is coupled through condenser 104 to an adjustable tap on the symmetry adjusting resistance 105, such resistance 105 being connected between ground and the cathode of tube V-3B. The cathode of tube V-3B is connected through a two-microsecond delay line 106 and condenser 107 to the control grid of tube V-6B. The cathodes of tubes V-6A and V-6B are returned to ground through a common potentiometer resistance 107 so that these two tubes operate essentially as a cathode follower with the adjustable tap on resistance 107 being connected to lead 108 (Figs. 4 and 1) to which is connected an intensity control electrode of the cathode ray tube 20. It is to be noted that the control grid of the tube V-6A is connected to a −150 volt source through resistances 111 and 112; similarly control grid of tube V-6A is connected to the same −150 volt source through resistances 111 and 113. Condenser 115 has its ungrounded terminal connected to the junction point of resistances 112, 113. Also connected between such junction point and ground are the serially connected resistances 117 and on-off switch 118 for purposes of removing the index marks from the cathode ray tube display. With the switch 118 open the condenser 115 charges to a high negative value thereby cutting off the current flow through tube V-6A and V-6B and thus removing the index marks from the display. With the switch 118 closed, the condenser 115 is charged only to a relatively small value permitting normal operation of the tubes V-6A and V-6B as cathode followers. The intensity of the index marks may be adjusted by adjusting the position of the tap on resistance 107.

*Minimum coast speed circuitry*

In order to avoid the possibility of the tracking unit locking on ground clutter, a minimum coast speed circuit involving the tubes 10A, 10B is provided. It is noted that the control grid of tube V-10A is coupled to the movable tap on the above mentioned resistance R38, having one terminal thereof connected to the range voltage lead 82. The voltage thus applied to the control grid of tube V-10A is a measure of the range voltage. The two tubes V-10A, V-10B are interconnected to function as a regenerative amplifier. A voltage dividing network in the anode circuit of tube V-10A comprising resistances R42, R43, and R45 is so arranged that decreasing range voltage causes the first triode section V-10A to cut off and the second triode section 10B to conduct when the tracked aircraft reaches a given range from touchdown. The value of the potential applied to the control grid of the first triode section V-10A and therefore the circuit controlling voltage is varied by adjustment of the tap on potentiometer R38. A minimum coast speed voltage is applied from the adjustable tap on resistance R43 to a control grid of the cathode follower tube V-8. This causes an approximately equal voltage to appear at the cathodes of V-8, and maintains a minimum input value to the range integrator V-9. For a minimum tracking velocity corresponding to 50 knots, the cathode of tube V-8 is maintained at approximately 5 volts positive with respect to ground. The above described minimum coast speed circuitry thus provides automatic minimum velocity of the index marks 22, with a preset range, and prevents the range gate from locking onto a fixed clutter area.

It is noted that when the above mentioned tube V-10B conducts the winding of relay K1 is energized to thereby open the normally closed switch 120 so as to connect the resistance 121 in a serial circuit with condenser C11. Thus, in the initial stages of coasting, the condenser C11 is connected between one control grid of tube V-8 and ground but during subsequent coasting at closer ranges condenser C11 is connected between such control grid and ground through the resistance 121. The time constant of the circuit is thus increased and, in effect, the "memory" of the first integrator circuit, including condenser C11, is "stiffened."

*No take-off warnings*

Voltage representative of the range voltage appearing on tap R39 is applied to the control grid of tube V-23A through resistance R129. Decreasing range voltage causes the tube V-23A to cut off, and the second triode section V-23B to conduct when the tracked aircraft reaches a predetermined range from touchdown. In conducting, the second triode V-23B energizes the winding of relay K5, sounding the no take-off chime 48 and illuminating the white no take-off channel lamp 47. The voltage applied to the grid of tube V-23A, corresponding to the range from touchdown to which the above mentioned no take-off warnings are actuated is adjusted by adjusting the tap on resistance R39. Thus, both visual and aural indications are automatically produced when an approaching aircraft is within a given range from touchdown.

*No video alarm*

Video, coinciding with either early or late gates 91, 92, and developed across the center winding of transformer 94, is applied to the control grid of the buffer amplifier tube V-20. The amplified video is applied from the anode of tube V-20 to the blocking oscillator stage V-15. The output of stage V-15, in the form of sharp pulses, is rectified by rectifier tube V-16A to charge a capacitor C31 to a negative potential. The negative potential of capacitor C31 biases tube V-22 to cut off. The bias thus developed is allowed to decay through the condenser discharge path which includes the serially connected resistances R93 and R88. When this bias actually decays, as a result of loss of video signals, tube V-22 is allowed to conduct to thereby energize the winding of relay K6 and to in turn cause illumination of the red "No Video" panel lamp 63 and to sound the No Video alarm bell 62. It is noted that the tube V-22 is a gas tube and has its cathode grounded. The anode of tube V-22 is connected through the winding of relay K6, resistances 99 and switch 150 to the positive terminal of voltage source 151. The screen grid of tube V-22 is connected through resistance R98 and switch 150 to the same positive terminal of source 151.

Due to circuit constants the potential on condenser C31, in the absence of video, discharges through the resistor R93 in five seconds. The absence of video signals for a two second period causes actuation of the No Video warnings. It is noted that this time period of two seconds is adjustable by adjusting the position of the tap on resistance R88.

Operation of the no video alarm thus depends on firing of thyratron V-22. The grid of this thyratron is normally held at a value well below cutoff by rectified range-gated video. If the target is acquired by slewing, (i. e. manual tracking in the manner described later) rapidly to the proper range and immediately operating the tracking switch 150 it is possible that gated video is available for an insufficient time before tracking begins and thus an immediate false alarm may be rendered. For this reason the shield grid of the thyratron V-22 is held at a negative potential by the voltage source 180 when the unit is slewing. When the unit is switched to the tracking function a positive potential is applied through resistor R98 to the shield grid. The shield grid potential is raised slowly by the charging of condenser C32, thus allowing sufficient time for the control grid of the thyratron to become biased to cutoff by video before the thyratron is permitted to fire. The diode, V-16A connected in shunt with condenser C32, prevents the shield grid potential from rising above zero volts.

*Manual tracking, i. e. slewing*

For purposes of acquiring a target, i. e., aircraft, for subsequent automatic range tracking, a manual control is provided which includes the ganged control knob of potentiometer resistor R64 and the mechanically related switches 154, 150. This resistor switch combination R64, 154, 155 may be of conventional construction as found in the prior art wherein angular rotation of a manual control shaft serves to adjust the position of the tap on resistance R64 and axial movement of such control shaft serves to cause actuation of switches 150, 155 simultaneously.

As shown in Figure 4 the apparatus is conditioned for manual tracking or slewing. In such case the switches 155, 150 are open. It is noted that the switch 154 has one of its terminals grounded and its movable terminal serially connected with the winding of relay K3, resistance R54, winding of relay K2 and the voltage source 161. In the deenergized condition of relay K3, as shown, the associated switch 162 is opened to thereby interrupt the connection to the speed meter 41 so as to prevent its damage in the event that resistance R64 is varied too fast in which case the artificially created speed voltage is too high and may cause damage to the meter 41.

The other single pull double throw switch 163 of relay K3, serves to energize the manual tracking or slew lamp 165 through a circuit which includes the voltage source 165, switch 166, switch 163 and the lamp 165. The other relay K2 has associated therewith the two single pull double throw switches 170 and 97, 99. As shown, switch 170 serves to transfer to the control grid of tube V-1B either the voltage appearing on the tap of resistance R64 or the voltage appearing on the anode of tube V-9B. The switch 99 serves to ground the control grid of tube V-9 through switch 98, the switch 98 being associated with the No Video relay K6 and is normally closed. In the automatic tracking position the switch 170 serves to interconnect the anode of tube V-9 to the control grid of tube V-1B; and the switch 97 serves to transfer the voltage existing on the cathode of tube V-8 to the control grid of tube V-9.

Thus with the switches shown in their position in Figure 4 manual variation of the tap on resistance R64 serves to control the D.-C. voltage applied to the control grid of tube V-1B and thus the potential on the range voltage lead 82. This tap may be moved continuously to in turn produce a continuous variation on the lead 82 and a resulting continuous movement of the index marks (which are visible on the face of the cathode ray tube). When such index marks bracket the image of an aircraft on the cathode ray tube the operator causes the switches 154, 155 to close so as to condition the unit for automatic range tracking. It is observed that actuation of switch 155 to its automatic range tracking position results in energization of the windings of relay K3 and K2 to effect the aforementioned connections and to disconnect the slew indicating lamp 165 and to energize the automatic tracking indicating lamp 175.

It is noted that in the absence of video, i. e. upon actuation of the No Video relay K6 described above in connection with No Video circuitry, neither lamp 165 nor lamp 175 is energized inasmuch as the switch 166 supplying current to either lamp 165 or 175, as the case may be, is interrupted, in such case only the "No Video" lamp 63 and associated bell 62 is energized. Further, it is noted that in manual tracking, the "No Video" circuitry is prevented from being operated inasmuch as the switch 150 serving to supply current to the tube V-22 is opened. Similarly, the Overtake warning circuit of thyratron tube V-21 is rendered inoperative during manual tracking inasmuch as it is likewise supplied with current through the switch 150 which at this time is open.

Summarizing briefly the operation of the system, the operator first acquires a target, i. e. aircraft, with the switches 154, 155 in their open position shown in Figure 4 and by adjusting the tap on the potentiometer resistance R64 until the index marks observable on the face of the cathode ray tube bracket the image of the aircraft on such tube. When this condition is achieved the operator closes the switces 154, 155 and in such case the circuitry automatically tracks the movement of the aircraft in range.

It is noted that in slewing, i. e. manual tracking, the condenser C13 acquires a voltage which is representative of the range to which the index marks are displayed visually and that the condenser C13, being a storage device, remembers that range during the transition period from manual to automatic tracking. In other words, the value of voltage acquired by the condenser C13 is that value which the condenser assumes at the start of automatic tracking so that the loop as a whole, in the transition, is devoid of large transitory voltages and in fact a smooth transition is made from manual to automatic tracking.

*Calculation of integrator rate*

The range integrator consists basically of a D.-C. amplifier stage V–9 having degenerative derivative feed back provided by a path which includes resistors 190, 191, and condenser C13. Regenerative feed back is provided to increase the gain, the regenerative feed back path including the resistances R37 and R36. If desired, the gain may be linearized by inserting a thyrite resistance in series with such resistors R36 and R37.

It is observed that in a perfect integrator the time constant is infinite since the slope is constant and independent of time. However, the rate of integration depends directly on the resistance and capacity components in the feed back circuit. Assuming infinite gain due to regenerative feed back across resistance R36, the grid of tube V–9 may be assumed to be a virtual ground, i. e. it will remain at zero volts for all values of output and input within the limits of the circuit design. With a two microfarad capacitor as C13 and a 5.5 megohm resistor, i. e. resistance 190 is 3.3 megohms and resistance 191 is 2.2 megohms, comprising in combination an 11-second product and a one volt signal applied, the output changes at a rate such that the derivative developed across resistances 190 and 191 exactly oppose the one volt input and maintain the grid at zero voltage as expressed in Figure 6. This rate is therefore $$\frac{-1}{11}$$

volts per second. Thus the integration rate in volts per second per volt is $$\frac{1}{RC}$$

and thus establishes the integration rate.

It is observed further that the range integrator including the tube V–9 supplies a range voltage to the time modulator V–2 over lead 82, which is adjusted by means of the expansion adjustments to maintain a range scale of 5 volts per mile or 50 volts for the entire 10-mile range.

The time constant of the integrator is such as to require a speed voltage input from the first integrator stage including tubes V–7A and V–7B, which for normal approach speeds provides ample margin for acceleration of the tracking loop to take care of initial errors existing at the time of target acquisition. Since the limits of the first integrator are approximately +45 volts and —30 volts, an arbitrary choice of 3 volts per 100 miles is made. At 100 knots, the range voltage changes:

$$\frac{V.\ P.\ M. \times M.\ P.\ H.}{3600} = \frac{5 \times 100}{3600} = .139 \text{ v./sec.}$$

The RC product of the second integrator, for the speed scale chosen, is:

$$T = \frac{e}{dE/dt} = \frac{3}{139} = 21.5 \text{ sec.}$$

However, a voltage divider of 2:1 ratio is used, since resistance 193 and restistance R31 are each 100,000 ohms so that a 10.8-sec. product gives the desired result. The product actually used is (2.2 M+3.3 M)×2u=11 sec.

The actual speed scale, including the gain of the cathode follower, is:

$$e = \frac{RC \frac{dE}{dt}}{A_{cf}} \times \text{divider ratio} = \frac{11 \times .139}{.97} \times 2 = 3.15 \text{ v./100 M. P. H.}$$

The maximum tracking speed is $$\frac{45 \times 100}{3.5} = 1400 \text{ M. P. H.}$$

In the absence of gated video information, the speed voltage output of the first integrator is remembered. Over long periods of time, however, this voltage may drift to extreme values which would handicap the lock-on process by driving the gates off the target before the video information could properly revise the speed voltage. Therefore the "Slew-Track" switch 150, 155 is connected to ground the first integrator capacitor during slewing, so that the output of the first integrator has an initial small nominal value which the loop can readily correct.

It is observed further that the condenser C12, connected in shunt with the resistances 190 and 193 serves to stabilize the overall loop, i. e. serves to impart a certain phase to the overall loop in relationship to the frequency of various feed back voltages so that "hunting" or oscillations in the overall loop is prevented while yet allowing the loop to respond quickly to speed voltages existing across capacitor C11. The condenser C12 serves an important function at the time of change over from manual tracking or slewing to automatic tracking, particularly when large corrections are required to make the voltage appearing across condenser C11 conform with the actual speed of the aircraft being tracked. In such case the voltage difference in the form of transient is readily passed by the condenser C12 to the control grid of the second integrator stage V–9. The stage V–9 thus responds quickly and provides a necessary correction voltage in a relatively short period of time.

Figure 6 serves to illustrate the operating conditions of the second integrator or range integrator shown in Figure 4. As illustrated, because of regenerative feed back between stages V–9 and V–1B the overall amplification may be considered to be infinite as indicated in Figure 6. In view of such high overall gain a virtual ground exists at the control grid of tube V–9. Expressed mathematically, the input voltage $$E_i + K \frac{dE_0}{dt} = 0$$

K is the integration rate and is equal to 5.5×2 or 11. Since there is an expression of $$\frac{dE_0}{dt}$$

i. e., a differentiation with respect to time, the equivalent circuit shown in Figure 7 may be realized and the differentiating network therein includes the condenser C13 and resistance 190, 191.

Figure 5 serves to illustrate the action of the overall range tracking loop when, as assumed, the flight of the aircraft created artifically is abruptly changed from a magnitude corresponding to 100 miles per hour to a magnitude corresponding to 150 miles per hour. In such case the voltage actually appearing across the condenser C11 varies as indicated by the curve 210 which is devoid of any oscillatory condition but has some overshoot, i. e. approximately 20% overshoot.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described, means producing an antenna beam periodically scanning through space and deriving therefrom video echo signals from a target in said space, said video echo signals being delayed different amounts according to the range of the target, a servo-loop for deriving from said video signals a range voltage which represents in magnitude the range of said target, said servo-loop comprising: means for deriving a pulse from said range voltage which is delayed in amount in proportion to the magnitude of said voltage, a coincidence circuit operated upon coincidence of an echo signal with said pulse, condenser means coupled to said coincidence circuit and charged in different amounts in accordance with the relative time spacing of said echo signals and said pulse, an integrating network coupled to said condenser means for developing said range voltage, said integrating network comprising a regenerative amplifier having a gain larger than unity, and means transferring continuously the voltage developed on said condenser means to said integrating network, means controlled by said range voltage for deriving a coasting voltage, and means applying said coasting voltage to said integrating network.

2. In a system of the character described, means producing an antenna beam periodically scanning through space and deriving therefrom video echo signals from a target in said space, said video echo signals being delayed different amounts according to the range of the target, a servo-loop for deriving from said video signals a range voltage representing the range of said target, said servo-loop comprising: means for deriving a pulse from said range voltage which is delayed in amount in proportion to the magnitude of said voltage, condenser means, means charging said condenser means in accordance with the time spacing between said pulse and echo signals to thereby derive a voltage across said condenser means which is a measure of the velocity of said target, second condenser means coupled to the first mentioned condenser means for developing said range voltage and means continuously transferring the voltage from said first condenser means to said second condenser means, means controlled by said range voltage for deriving a coasting voltage, and means applying said coasting voltage to said second condenser means.

3. In a system of the character described, means producing an antenna beam periodically scanning through space and deriving therefrom video echo signals from a target in said space, said video echo signals being delayed different amounts according to the range of the target, a servo-loop for deriving from said video signals a range voltage representing the range of said target, said servo-loop comprising: means for deriving a pulse from said range voltage which is delayed in amount in proportion to the magnitude of said range voltage, a first integrating network energized in accordance with the time spacing of said pulse and echo signals to derive a first voltage which is representative of the speed of the target, a second integrating network coupled to said first integrating network for developing said range voltage means continuously transferring said first voltage to said second integrating network, said second integrating network incorporating an amplifier having regenerative feed back with a gain larger than unity, means controlled by said range voltage for deriving a coasting voltage, and means applying said coasting voltage to said second integrating network.

4. In a system of the character described, a source of pulses occurring at a relatively high repetition rate, means producing an antenna beam which periodically scans through space at a relatively low repetition rate and deriving therefrom video echo signals from a target in said space, said video echo signals appearing at the same repetition rate as said pulses but being delayed different amounts according to the range of the target, a servo-loop for deriving from said video signals a range voltage representing the range of said target, said servo-loop comprising: means operated in timed relationship with appearance of said pulses for deriving a timing pulse from said range voltage, said timing pulse being delayed in amount in proportion to the magnitude of said range voltage, comparison means for making a comparison of the time spacing between echo signals and timing pulses, a first integrating network coupled to said comparison means for deriving a first voltage representative of the speed of said target, a second integrating network coupled to said first integrating network and developing said range voltage and means continuously supplying said first voltage to said second integrating network, means controlled by said range voltage for deriving a coasting voltage, and means applying said coasting voltage to said second integrating network.

5. In a track while scan system of the character described wherein an object in space is tracked while an antenna beam scans continuously through said space, the combination comprising first integrating means for developing a voltage representative of the speed of the object, second integrating means coupled to said first integrating means and controlled by the first-mentioned voltage for developing a voltage for producing a voltage representative of the range of the object, and means continuously transferring the first-mentioned voltage developed in said first integrating means to said second integrating means, means controlled by said range voltage for deriving a coasting voltage, and means applying said coasting voltage to said second integrating means.

6. The arrangement set forth in claim 5 in which said second integrating means comprises a regenerative amplifier having a gain larger than unity.

7. The arrangement set forth in claim 5 in which means are provided for transferring the first-mentioned voltage developed in said first integrating means continuously to said second integrating means at a predetermined rate for stability purposes.

8. A system as set forth in claim 3 including means sensitive to the magnitude of said range voltage for altering the integration rate in said first integrating network.

9. A system as set forth in claim 5 including means sensitive to the magnitude of said range voltage for altering the integration rate in said first integrating means.

10. In a track while scan system of the character described wherein an object in space is tracked while an antenna beam scans continuously through said space and develops video echo signals from said object, the combination comprising first integrating means comprising a condenser for developing a speed voltage representative of the speed of the object, second integrating means coupled to said first integrating means and controlled by the first-mentioned speed voltage for producing a range voltage representative of the range of the object, range pulse developing means responsive to said range voltage for developing a range pulse which is delayed in time a degree dependent upon the magnitude of said range voltage, said first integrating means comprising condenser charging means responsive to the relative time spacing between a range pulse and a corresponding echo signal for charging said condenser in a degree dependent upon the time spacing between said range pulse and the corresponding video echo signal, said condenser charging means being ineffective to discharge said condenser in the absence of said video echo signal and said range pulse so that said condenser continues to maintain its charge without diminution during substantially an antenna beam scanning cycle, said second integrating means having an input terminal to which said voltage representative of said speed is applied, said second integrating means having an output terminal at which said voltage representative of said range appears, a resistance and a condenser serially connectible between said input and output terminals, first switching means including a single pole-double throw switch having its movable contact connected to one terminal of said condenser, the other terminal of said condenser being connected to said output terminal, said first switching means including a first stationary contact connected to one terminal of said resistance, the other terminal of said resistance being connected to said input terminal, said first switching means including a second stationary contact which is grounded, said second integrating means including a first tube and a second tube connectible in cascade to provide regenerative amplifying means, said first tube having a control grid connected to said movable contact, a source of adjustable voltage, second switching means comprising a single pole-double throw switch having a movable contact connected to the control grid of said second tube, said second switching means having a first stationary contact connected to the anode of said first tube, said second switching means having a second stationary contact connected to said source, means coupling the output of said second tube to said output terminal, and said first and second switching means being operated jointly.

11. In a track while scan system of the character described wherein an object in space is tracked while an antenna beam scans continuously through said space and develops video echo signals from said object, the combination comprising first integrating means comprising a condenser for developing a speed voltage representative of the speed of the object, second integrating means coupled to said first integrating means and controlled by the first-mentioned speed voltage for developing a voltage representative of the range of the object, range pulse developing means responsive to said range voltage for developing a range pulse which is delayed in time in a degree dependent upon the magnitude of said range voltage, said first integrating means comprising condenser charging means responsive to the relative time spacing between a range pulse and a corresponding echo signal for charging said condenser in a degree dependent upon the time spacing between said range pulse and the corresponding video echo signal, said condenser charging means being ineffective to discharge said condenser in the absence of said video echo signal and said range pulse so that said condenser continues to maintain its charge without diminution during substantially an antenna scanning cycle, said second integrating means having an input terminal to which said voltage representative of said speed is applied, said second integrating means having an output terminal to which said voltage representative of said range appears, a resistance, a condenser, said resistance and condenser being serially connected with one terminal of said resistance being connected to said input terminal, and with one terminal of said condenser being connected to said output terminal, a regenerative amplifying means having an input terminal connected to the junction point of said resistance and condenser, the output terminal of said amplifying means being connected to said output terminal of said second integrating means.

12. In a track while scan system of the character described wherein an object in space is tracked while an antenna beam scans continuously through said space and develops video echo signals from said object, the combination including first integrating means comprising a condenser across which is developed a velocity voltage representative of the velocity of the object, second integrating means responsive to said velocity voltage for developing a range voltage representative of the range of said object, range pulse developing means responsive to said range voltage for developing a range pulse which is delayed in time in a degree dependent upon the magnitude of said range voltage, said first integrating means comprising condenser charging means responsive to the relative time spacing between a range pulse and the corresponding video echo signal for charging said condenser in a degree dependent upon the time spacing between said range pulse and the corresponding video echo signal, said condenser charging means being ineffective to discharge said condenser in the absence of said video echo signal and said range pulse so that said condenser continues to maintain its charge without diminution during substantially an antenna beam scanning cycle.

References Cited in the file of this patent

UNITED STATES PATENTS

| Number | Name | Date |
|---|---|---|
| 2,251,973 | Beale et al. | Aug. 12, 1941 |
| 2,268,587 | Guanella | Jan. 6, 1942 |
| 2,459,074 | Hastings-Hodgkins | Jan. 11, 1949 |
| 2,487,510 | Baker | Nov. 8, 1949 |
| 2,491,029 | Brunn | Dec. 13, 1949 |
| 2,495,753 | Mozley | Jan. 31, 1950 |
| 2,508,565 | Chance | May 23, 1950 |
| 2,516,343 | Roberts | July 25, 1950 |
| 2,516,356 | Tull et al. | July 25, 1950 |
| 2,572,986 | Chance | Oct. 30, 1951 |
| 2,577,536 | MacNichol | Dec. 4, 1951 |
| 2,609,533 | Jacobsen | Sept. 2, 1952 |